(12) United States Patent
Park

(10) Patent No.: US 11,371,624 B2
(45) Date of Patent: Jun. 28, 2022

(54) FLOW-BLOCKING SAFETY VALVE TO PREVENT EXPLOSION OF PORTABLE GAS CONTAINER

(71) Applicant: DAERYUK CAN CO., LTD., Seoul (KR)

(72) Inventor: Bong June Park, Seoul (KR)

(73) Assignee: DAERYUK CAN CO., LTD., Seoul (KR)

( * ) Notice: Subject to any disclaimer, the term of this patent is extended or adjusted under 35 U.S.C. 154(b) by 0 days.

(21) Appl. No.: 17/187,916

(22) Filed: Mar. 1, 2021

(65) Prior Publication Data
US 2021/0310575 A1 Oct. 7, 2021

(30) Foreign Application Priority Data
Mar. 31, 2020 (KR) .................. 10-2020-0038883

(51) Int. Cl.
| | |
|---|---|
| *F16K 17/38* | (2006.01) |
| *F16K 31/00* | (2006.01) |
| *F17C 13/04* | (2006.01) |
| *F17C 13/12* | (2006.01) |
| *F16K 17/36* | (2006.01) |

(52) U.S. Cl.
CPC .......... *F16K 31/002* (2013.01); *F16K 17/366* (2013.01); *F16K 17/383* (2013.01); *F17C 13/04* (2013.01); *F17C 13/12* (2013.01); *F17C 2205/0332* (2013.01); *F17C 2205/0391* (2013.01); *F17C 2260/042* (2013.01)

(58) Field of Classification Search
CPC .... F16K 31/002; F16K 17/366; F16K 17/383; F17C 13/04; F17C 13/12; F17C 2205/0332; F17C 2205/0391; F17C 2260/042
USPC .... 137/587, 68.12, 72, 74, 76; 251/111, 102
See application file for complete search history.

(56) References Cited

U.S. PATENT DOCUMENTS

| | | | | |
|---|---|---|---|---|
| 4,365,643 A | * | 12/1982 | Masclet ................ | F16K 17/383 137/224 |
| 5,477,877 A | * | 12/1995 | Schulze .................. | A62C 4/02 137/457 |
| 5,742,008 A | * | 4/1998 | Dalrymple .......... | H01B 7/0869 174/99 R |
| 10,197,176 B2 | * | 2/2019 | Hathaway ............. | F16K 17/383 |
| 10,633,167 B2 | * | 4/2020 | Kim .......................... | B05B 1/00 |
| 10,683,947 B2 | * | 6/2020 | Won ......................... | F24C 3/00 |

(Continued)

FOREIGN PATENT DOCUMENTS

| | | |
|---|---|---|
| KR | 10-1828284 B1 | 2/2018 |
| KR | 10-1895583 B1 | 8/2018 |

(Continued)

*Primary Examiner* — Minh Q Le
(74) *Attorney, Agent, or Firm* — Mark M. Friedman

(57) ABSTRACT

There is provided a flow-blocking safety valve to prevent an explosion of a portable gas container, wherein, when the portable gas container overheats during use and the temperature rises above a predetermined level, a bridge hold supporting a pin of the safety valve melts and thus a pin or ball securely supported in the bridge holder becomes free to move to close a flow channel through which the gas flows, thereby blocking the gas discharge and preventing an accident occurring when the gas container bursts by overheating.

8 Claims, 12 Drawing Sheets

(56) References Cited

U.S. PATENT DOCUMENTS

| | | | | |
|---|---|---|---|---|
| 2008/0164256 | A1* | 7/2008 | Youm | F17C 13/123 |
| | | | | 220/89.2 |
| 2020/0232572 | A1* | 7/2020 | Lyon | F16K 37/005 |
| 2021/0190270 | A1* | 6/2021 | Seitter | F17C 13/12 |
| 2021/0403227 | A1* | 12/2021 | Jang | B65D 83/48 |

FOREIGN PATENT DOCUMENTS

| | | |
|---|---|---|
| KR | 10-2087334 B1 | 3/2020 |
| KR | 10-2092499 B1 | 3/2020 |

\* cited by examiner (a)

(b)

(a)

(b)

FLOW-BLOCKING SAFETY VALVE TO PREVENT EXPLOSION OF PORTABLE GAS CONTAINER

CROSS-REFERENCE TO RELATED APPLICATION

This application claims the benefit of Korean Patent Application No. 10-2020-38883 filed on Mar. 31, 2020, the disclosure of which is hereby incorporated herein by reference in its entirety.

BACKGROUND OF THE INVENTION

1. Field of the Invention

The present invention relates to a flow-blocking safety valve in a portable gas container and more particularly, to a flow-blocking safety valve to prevent an explosion of a portable gas container, wherein, when the gas container overheats during use and the temperature rises above a predetermined level, a bridge holder supporting a pin of the safety valve melts to close a flow channel through which the gas flows, thereby blocking the gas discharge.

2. Description of the Related Art

A portable gas container is filled with a butane gas mixture having butane gas, as a main raw material, among liquid petroleum gases. When a butane gas container gets high heat during its distribution process or its use, the pressure of the liquid gas filled in the butane gas container increases to explode the container. Especially, when a user uses the butane gas container used for a portable gas range without following the safety regulations or the user uses an excessively big firing plate so that heat continues to apply to the gas container, the gas container's temperature rises and its internal pressure increases and therefore the gas container may deform or explode in a worse case.

To solve the above problems, Korean Patent No. 1828284 entitled "Safety valve and gas container with the same" provides the technology of blocking gas discharge by closing a gas flow channel rather than releasing an overpressure gas when the pressure within a portable gas container reaches over a certain level. According to the technology of this patent, since an interlocking blocking section is made of a material melting at a predetermined temperature, when the interlocking blocking section is melted by temperature rise, a blocking pin member moves forwardly in an opening/closing channel section by the internal pressure of the container, so that the interlocking blocking section of the blocking pin member adheres to the inside of the opening/closing channel section, to block gas discharge. However, this patent has the following problems:

First, an adhering incline in a truncated conical shape, which is positioned at the front end of the blocking pin member, closes the opening/closing channel section, to block a gas flow. A gas channel member protrudes or a groove is formed at equal intervals on the outer surface of the contact incline in the truncated conical shape. Only when the protruding gas channel member completely melts, the adhering incline in the truncated conical shape can adhere to the inner surface of the opening/closing channel section so that the gas flow can be blocked. In this regard, however, it is impossible for only the gas channel member protruding on the outer surface of the adhering incline to melt while the adhering incline does not melt. Therefore, a serious problem is that it is very difficult to block the gas flow even if the temperature inside the gas container rises above a predetermined level by overheating the gas container.

Second, if the gas channel member protruding on the outer surface of the adhering incline melts, the adhering incline also melts. Therefore, even though the outer surface of the adhering incline adheres to the inner surface of the opening/closing channel section, since an opening (crack) between the two is formed, this causes the serious problem that the gas flow cannot be perfectly closed.

Third, if, upon assembling, the blocking pin member is not accurately settled but slightly titled, since the adhering incline positioned at the front of the blocking pin member does not perfectly adhere to a gas channel, there is a risk of gas leakage.

The technology in Korean Patent No. 1895583 entitled "Aerosol can with overpressure protector and valve assembly thereof" has a structure in that a closure member in a spherical shape and a shape memory alloy in a partially-cut ring shape are assembled in a body of a flow blocking valve. When the temperature inside a gas container rises above a predetermined level, the cut part of the shape memory alloy is opened to expand the front end of the body. When the front end of the body expands, the closure member moves forwardly to close an inlet of a communicating channel in a stem housing, thereby blocking gas discharge. In this patent, since the body forming the flow blocking valve, the closure member and the shape memory alloy are separated in separate constitutions, the structure is complicated and the assembling work is difficult, a possibility of causing an assembly defect is high and a lot of manpower and time are required for assembling the structure. Further, since the shape memory alloy is used, the manufacturing cost per section significantly increases.

SUMMARY OF THE INVENTION

Therefore, it is an object of the present invention to provide a flow-blocking safety valve to prevent an explosion of a portable gas container, wherein, when the gas container overheats during use and the temperature rises above a predetermined level, a bridge holder supporting a pin of a safety valve melts and thus the pin or ball fixedly supported by the bridge holder becomes free to move to sealingly engage a flow channel through which gas flows, thereby blocking the gas discharge. Accordingly, the flow-blocking safety valve to prevent an explosion of a portable gas container prevents an accident which may occur since the gas container bursts by overheat.

In accordance with a first embodiment of the present invention, there is provided a flow-blocking safety valve to prevent an explosion of a portable gas container comprising: a pin including a body section, a flow channel blocking section, a holding section and a gas flow channel, which are integrally formed, wherein the body section is in a cylindrical shape, the flow channel blocking section positioned at the front end of the body section has a forwardly tapered outer surface, the holding section positioned at the rear end of the body section is in a disk shape with a diameter greater than the diameter of the body section in the cylindrical shape, and the gas flow channel positioned at the rear end of the holding section has flat members radially arranged to form a passage through which the gas flows between the flat members; a bridge holder including a connection body in a ring shape having a predetermined width, a bridge with raised parts protruding, at equal intervals, from the ring-shaped inner surface to the center, and a gas flow opening formed between the raised parts of the bridge; and a stopper connected to the rear end of the horizontal section of the valve housing and including, in its center, a gas passage through which the gas filled in the gas container flows to the gas channel formed in the valve housing, wherein the body section of the pin passes through the center of the bridge holder, the holding section of the pin is supported in the bridge of the bridge holder so that the pin and the bridge holder are assembled together, and when the inside of the gas container overheats above a predetermined temperature the bridge of the bridge holder melts and thus the pin supportedly assembled in the bridge becomes free to move so that the flow channel blocking section of the pin sealingly engages a gas blocking section formed in the horizontal section of the valve housing, to close the flow channel to block the gas discharge.

In accordance with a second embodiment of the present invention, there is provided a flow-blocking safety valve to prevent an explosion of a portable gas container comprising: a pin including a body section, a flow channel blocking section, a flow channel forming projection, a holding section and a guide section, which are integrally formed, wherein the body section is in a cylindrical shape, the flow channel blocking section positioned at the front end of the body section has a forwardly tapered outer surface, the flow channel forming projection protruding, at equal intervals, at the outer surface of the rear end of the body section, to form a gas flow channel between the flow channel forming projections, the holding section positioned at the rear end of the body section is in a cylindrical shape with a diameter smaller than the diameter of the body section in the cylindrical shape and includes a raised part around its rear end, and the guide section extending from the rear end of the holding section at a predetermined length; a bridge holder including a connection body, a bridge and a gas flow opening, wherein the connection body is in a ring shape having a predetermined width, the bridge has a concentric center with the connection body in the ring shape, a through-hole formed in the concentric center to allow the cylinder-shaped holding section of the pin to pass through, and a rod-shaped member connecting the ring shape and the outer surface of the concentric center, which are integrally formed, and the gas flow opening formed between the rod-shaped members of the bridge; and a stopper connected to the rear end of the horizontal section of the valve housing and including a gas passage through which the gas filled in the gas container flows to the gas channel formed in the valve housing, wherein the cylinder-shaped holding section of the pin passes through the through-hole of the concentric center of the bridge holder, the raised part around the rear end of the holding section of the pin is supported and assembled in the through-hole formed in the center of the bridge holder, and when the inside of the gas container overheats above a predetermined temperature, the bridge of the bridge holder melts and thus the pin supportedly assembled in the bridge becomes free to move so that the flow channel blocking section of the pin sealingly engages a gas blocking section formed in the horizontal section of the valve housing, to close the flow channel to block the gas discharge.

In accordance with a third embodiment of the present invention, there is provided a flow-blocking safety valve to prevent an explosion of a portable gas container comprising: a pin including a body section in a cylindrical shape, a flow channel blocking section and a holding section, all which are integrally formed, wherein the flow channel blocking section positioned at the front end of the body section has a forwardly tapered outer surface, and the holding section positioned at the rear end of the body section and formed in a radial shape such that the holding section protrudes higher than the outer surface of the body section in the cylindrical shape but tapers backwardly to be smaller in the diameter of the rear end of the holding section; a stopper connected to the rear end of the horizontal section of the valve housing and including a through-hole in its center; and a bridge holder connected by being inserted into the through-hole formed in the center of the stopper and including a gas flow opening to allow a gas to enter, at its rear end, and a bridge to support the holding section of the pin, at its front, wherein the bridge holder is made of a material having a melting point which is lower than that of both the pin and the stopper, the pin, the bridge holder and the stopper are integrally formed by double injection in the state that the holding section of the pin is supported in the bridge of the bridge holder, so that the body section of the pin passes through the center of the bridge holder to forwardly protrude than the bridge holder and the stopper, and when the inside of the gas container overheats above a predetermined temperature, the bridge of the bridge holder melts and thus the pin supportedly assembled in the bridge becomes free to move so that the flow channel blocking section of the pin sealingly engages a gas blocking section formed in the horizontal section of the valve housing, to close the flow channel to block the gas discharge.

In accordance with a fourth embodiment of the present invention, there is provided a flow-blocking safety valve to prevent an explosion of a portable gas container comprising: a bridge holder and a stopper which are integrally formed; and a ball in a spherical shape which is assembled to be positioned in the bridge holder and the stopper, wherein the stopper is connected to the rear end of the horizontal section of the housing and includes a through-hole at its center so that the front and rear of the stopper are open, the outer surface of the front of the stopper is smaller in diameter than the outer surface of the rear of the stopper, the bridge holder is formed by inserting the outer surface of the front of the stopper, the bridge holder includes, at its front end, a bridge formed by projections protruding, at equal intervals, towards the center, to support the ball, and a gas flow opening formed between the bridges, wherein the bridge holder is made of a material having a melting point which is lower than that of both the ball and the stopper, the bridge holder and the stopper are integrally formed by double injection, the ball is assembled in the state of being supported in the bridge of the bridge holder, and when the inside of the gas container overheats above a predetermined temperature, the bridge of the bridge holder melts and thus the ball supportedly assembled in the bridge separates from the bridge holder and becomes free to move so that the ball sealingly engages a gas blocking section formed in the horizontal section of the valve housing, to close the flow channel to block the gas discharge.

In accordance with a fifth embodiment of the present invention, there is provided a flow-blocking safety valve to prevent an explosion of a portable gas container comprising: a pin including a body section, a flow channel blocking section and a holding section, which are integrally formed, wherein the body section is in a cylindrical shape, the flow channel blocking section positioned at the front end of the body section has a forwardly tapered outer surface, and the holding section positioned at the rear end of the body section is in a cylindrical shape with a diameter smaller than the diameter of the body section in the cylindrical shape and includes a raised part formed at the rear end of the holding section; and a stopper connected to the rear end of the horizontal section of the valve housing and including a gas flow opening and a through-hole, wherein the gas flow opening is formed to permit gas flow from the front end of the stopper to the rear end thereof, to permit the gas filled in the gas container to flow through the gas channel formed in the valve housing, and the through-hole passes through the center of the gas flow opening and tapers forwardly so that its diameter becomes smaller at its front end, to form a bridge to support the holding section of the pin, wherein the stopper is made of a material having a melting point which is lower than that of the pin, the body section of the pin is integrally formed to protrude in the front of the stopper in the state that the pin is inserted into the through-hole passing through the center of the stopper, and when the inside of the gas container overheats above a predetermined temperature, the bridge of the stopper melts and thus the holding section of the pin supportedly formed in the bridge of the stopper becomes free to move so that the flow channel blocking section of the pin sealingly engages a gas blocking section formed in the horizontal section of the valve housing, to close the flow channel to block the gas discharge.

In accordance with a sixth embodiment of the present invention, there is provided a flow-blocking safety valve to prevent an explosion of a portable gas container comprising: a pin including a body section, a flow channel blocking section, a holding section and a guide section, which are integrally formed, wherein the body section is in a cylindrical shape, the flow channel blocking section positioned at the front end of the body section has a forwardly tapered outer surface, the holding section positioned at the rear end of the body section is in a cylindrical shape with a diameter smaller than the diameter of the body section in the cylindrical shape and includes a raised part formed at the rear end of the holding section, and the guide section extends from the rear end of the holding section, at a predetermined length; a bridge holder including a connection body, a bridge and a gas flow opening, wherein the connection body is in a ring shape having a predetermined width, the bridge has a concentric center with the ring shape of the connection body, a through-hole formed in the concentric center to allow the cylinder-shaped holding section of the pin to pass through, and an integrally formed rod-shaped member connecting the ring shape and the outer surface of the concentric center, and the gas flow opening formed between the rod-shaped members of the bridge; and a stopper connected to the rear end of the horizontal section of the valve housing and including a gas passage to permit the gas filled in the gas container to flow through the gas channel formed in the valve housing, wherein the bridge holder is made of a material having a melting point which is lower than that of both the pin and the stopper, the pin and the bridge holder are integrally formed by double injection in the state that the cylinder shape of the holding section of the pin passes through the through-hole of the concentric center of the bridge holder and the raised part of the rear end of the holding section of the pin is supported in the through-hole formed the center of the bridge holder, and when the inside of the gas container overheats above a predetermined temperature, the bridge of the bridge holder melts and thus the pin supportedly and integrally formed in the bridge separates and becomes free to move so that the flow channel blocking section of the pin sealingly engages a gas blocking section formed in the horizontal section of the valve housing, to close the flow channel to block the gas discharge.

BRIEF DESCRIPTION OF THE DRAWINGS

The above and other features and advantages of the present invention will become more apparent to those of ordinary skill in the art by describing in detail preferred embodiments thereof with reference to the attached drawings in which.

Figure 1A:
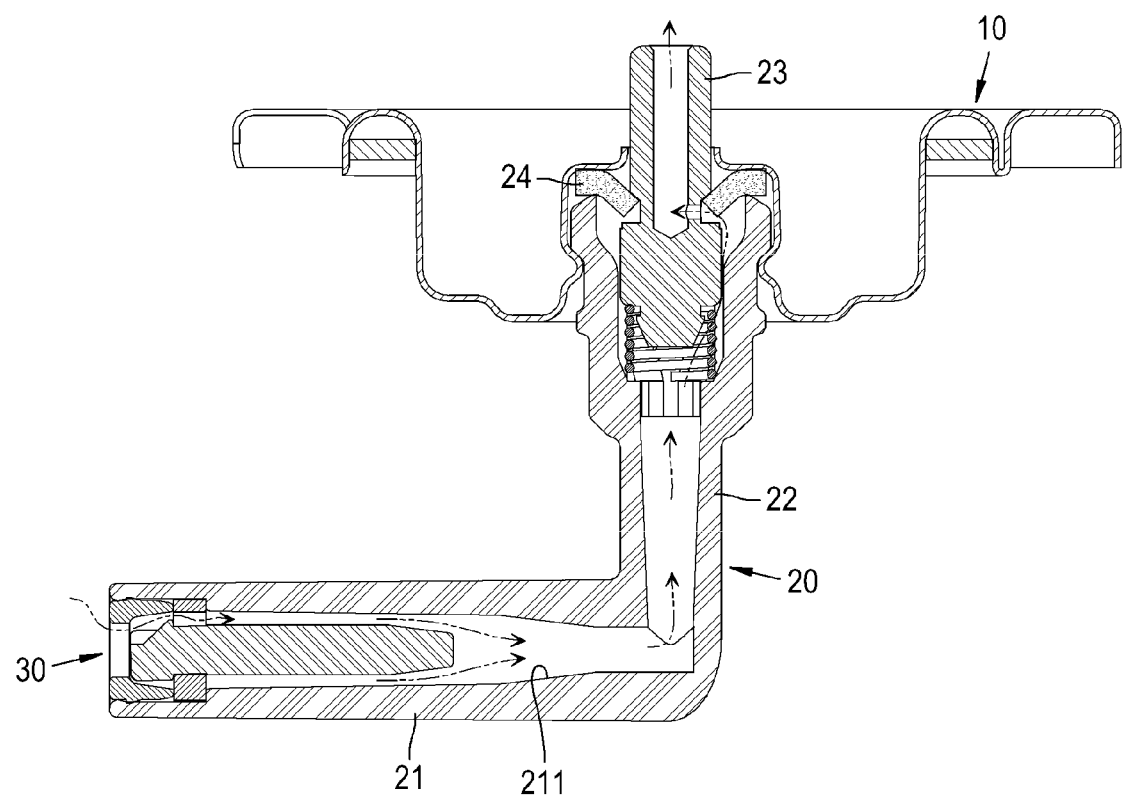
FIGS. 1a and 1b are cross-sectional views illustrating the states before (gas flow) and after (gas blockage) operating a safety valve according to the present invention.

| Description of numbers for constituients in drawings |
|---|
| 10: mounting cup |
| 20: valve housing     21: horizonal section |
| 211: gas blocking section     22: vertical section |
| 23: stem |
| 24: gasket |
| 30: safety valve |
| 31, 31', 31'': pin |
| 311, 311': body section |
| 312, 312': flow channel blocking section |
| 313, 313', 313'': holding section |
| 314: gas flow channel |
| 314': flow channel forming projection |
| 315': guide section |
| 32, 32', 32'': bridge holder |
| 321, 321': connection body |
| 322, 322', 322'': bridge |
| 323, 323', 323'': gas flow opening |
| 33, 33', 33'': stopper |
| 331, 331': combined body |
| 332, 332': fastening protrusion |
| 333, 333': gas passage |
| 40: safety valve |
| 41: ball |
| 42: bridge holder |
| 422: bridge |
| 423: gas flow opening |
| 43: stopper |
| 50: safety valve |
| 51: pin |
| 511: body section |
| 512: flow channel blocking section |
| 513: holding section |
| 53: stopper |
| 532: bridge |
| 533: gas flow opening |
| 60: safety valve |
| 61: pin |
| 611: body section |
| 612: flow channel blocking section |
| 613: holding section |
| 615: guide section |
| 62: bridge holder |
| 621: connection body |
| 622: bridge |
| 623: gas flow opening |
| 63: stopper |
| 633: gas passage |

DETAILED DESCRIPTION OF THE PREFERRED EMBODIMENT

The present invention will now be described more fully hereinafter with reference to the accompanying drawings, in which a preferred embodiment of the invention is shown so that those of ordinary skill in the art can easily carry out the present invention.

The technical feature of a flow-blocking safety valve to prevent an explosion of a portable gas container according to the present invention is that: when the gas container overheats and thus the temperature rises above a predetermined level, a bridge holder of the safety valve melts so that a pin or ball secured by the bridge holder becomes free to move to close a gas flow channel, thereby preventing an accident occurring when the gas container bursts by overheating.

In the present invention, gas is discharged through a stem 23 positioned to pass through the center of a mounting cup 10 connected to a top of a gas container. When the temperature inside the gas container rises above a predetermined level, the safety valve operates to close a flow channel through which the gas flows to the stem 23, thereby blocking the gas discharge. This safety valve is utilized in the portable gas container which does not have any separate housing to install the safety value, wherein the safety valve is inserted to be fastened in the gas channel formed in a valve housing 20.

The valve housing 20 is in the 1' shape with a horizontal section 21 and a vertical section 22 and it forms a flow channel through which gas flows. The upper part of the vertical section 22 is assembled with the mounting cup 10, to be securely installed. In the present application, the term, "vertical direction" means the length direction of the gas container, "horizontal direction" means the width direction of the gas container, that is, the direction which is perpendicular to the vertical direction, "front end" or "forwardly" means the direction towards the stem 23, "rear end" or "backwardly" means the opposite direction to the stem 23, that is, the inside of the gas container.

Figure 1B:
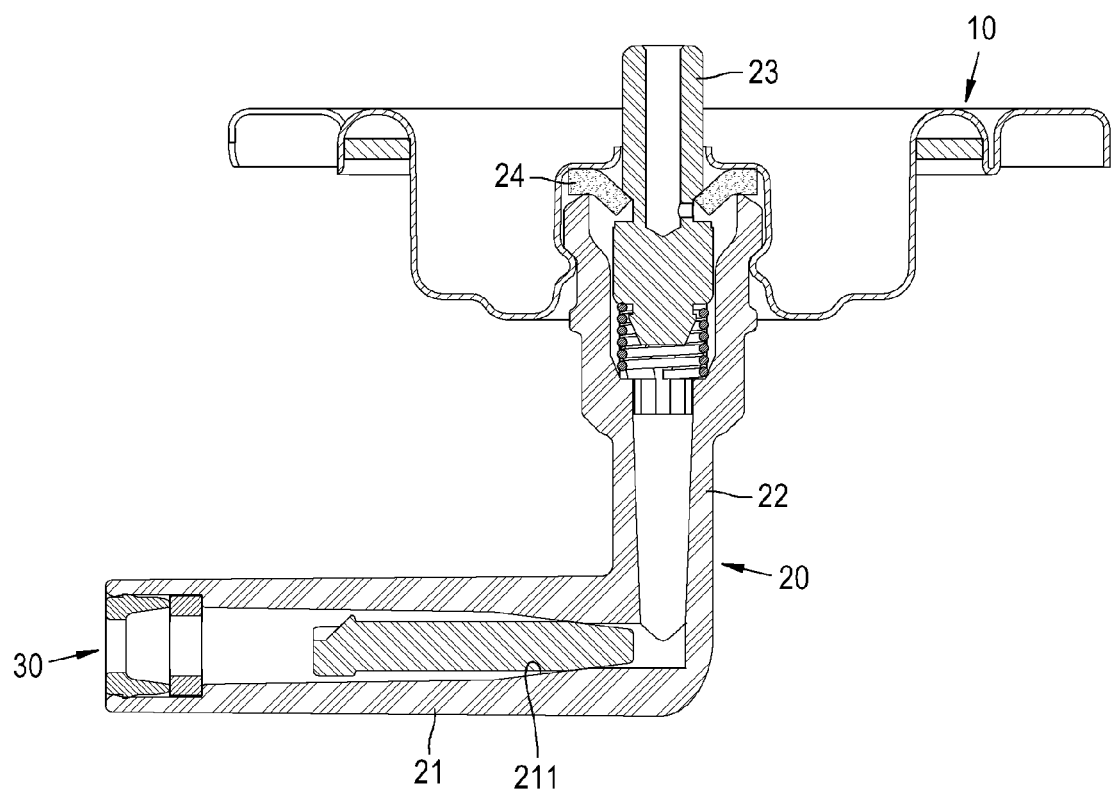
Figure 2A:
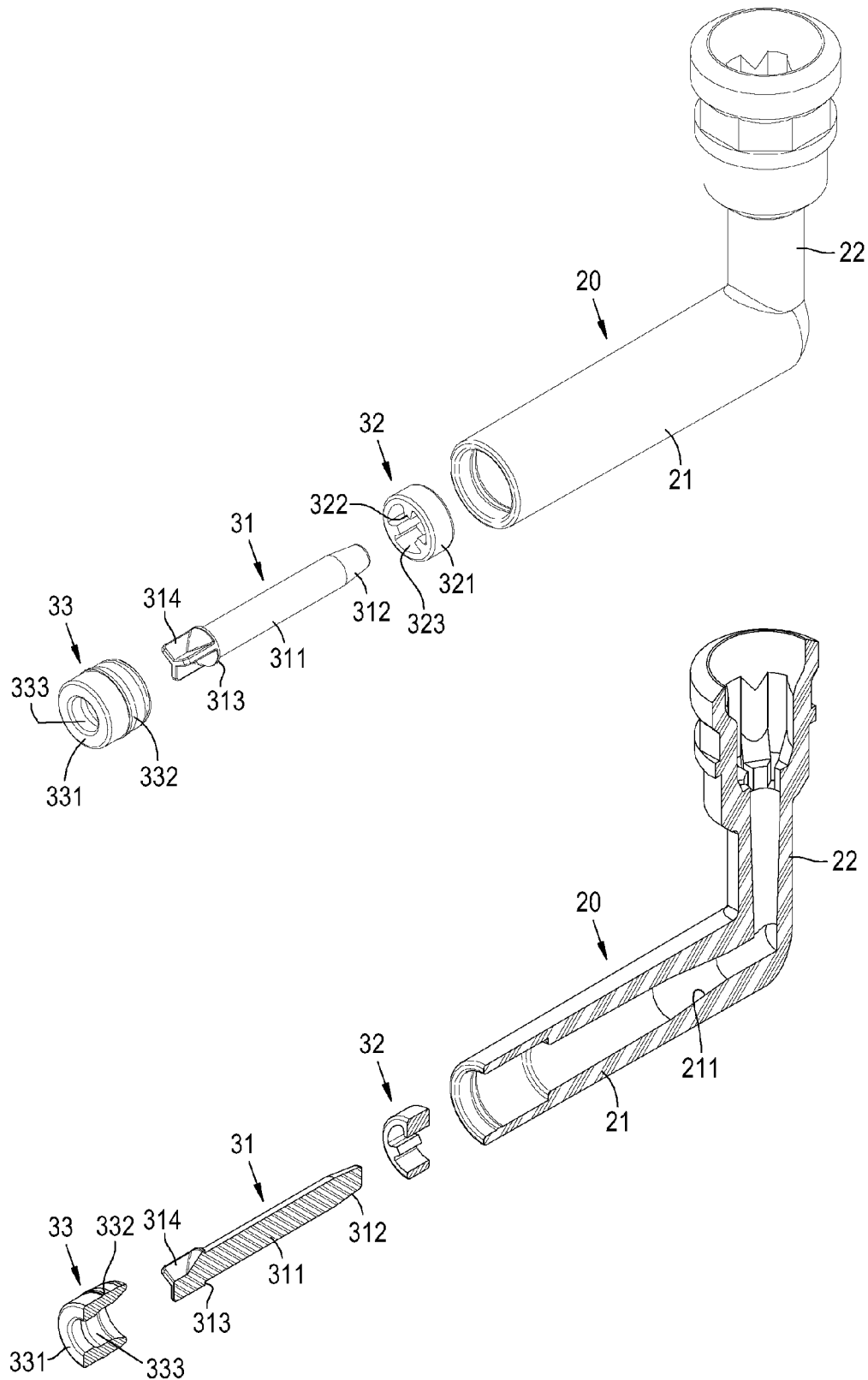
FIG. 2a is an exploded view of a safety valve according to a first embodiment of the present invention.

In FIGS. 1a, 1b and 2a, a safety valve 30 according to the first embodiment of the present invention comprises: a pin 31, a bridge holder 32 and a stopper 33. The pin 31 blocks a flow channel when the temperature inside a gas container rises above a predetermined temperature. The bridge holder 32 holds the pin 31 upon normal operation but it melts when the gas container overheats, so that the pin 31 supported by the bridge holder 32 separates from the bridge holder 32. The stopper 33 is connected to the rear end of the horizontal section 21 of the valve housing 20. Upon assembling, the bridge holder 32 is pushed to be inserted into the rear end of the horizontal section 21, the body section 311 of the pin 31 is pushed to pass through the center of the bridge holder 32, and the stopper 33 is pushed at the rear end of the horizontal section 21, to be connected together to finish assembling the safety valve 30.

The pin 31 comprises: a body section 311, a flow channel blocking section 312, a holding section 313 and a gas flow channel 314, which are integrally formed. The body section 311 is in a cylindrical shape. The flow channel blocking section 312 has an inclined outer surface like a truncated conical shape and is positioned at the front end of the body section 311. The holding section 313 in a disk shape is positioned at the rear end of the body section 311 in the cylindrical shape and has a greater diameter than the diameter of the body section 311 in the cylindrical shape. The gas flow channel 314 formed at the rear of the holding section 313 has flat members radially positioned, wherein a passage through which the gas flows is formed between the flat members.

The bridge holder 32 comprises: a connection body 321, a bridge 322 and a gas flow opening 323. The connection body 321 is in a ring shape with a certain width. The bridge 322 is formed of raised parts which protrude from its inner circumferential surface towards the center, at a predetermined height and at equal intervals. The gas flow opening 323 is formed in the space between the raised parts of the bridge 322. The body section 311 of the pin 31 passes through the center surrounded with the raised parts forming the bridge 322 of the bridge holder 32, and the holding section 313 of the pin 31 is placed on the bridge 322, to be assembled (see FIGS. 1a and 2a).

The bridge holder 32 is made of a material having a melting point which is lower than that of both the pin 31 and the stopper 33. When the inside of the gas container overheats above a predetermined temperature, the raised parts of the bridge 322 in the bridge holder 32 first melt and can no longer support the pin 31. At this time, since the pressure released from the inside of the gas container increases, the pin 31 becomes free to move such that the outer surface of the flow channel blocking section 312 of the pin 31 adheres to the inner surface of the gas blocking section 211 in the horizontal section 21 of the valve housing, thereby closing the flow channel to block the gas discharge (see FIG. 1b).

The stopper 33 is connected to the rear end of the horizontal section 21 of the valve housing 20. A gas passage 333 to permit the gas filled in the gas container to flow the flow channel formed in the valve housing 20 passes through the center of the stopper 33. A fastening protrusion 332 protrudes from the outer surface of the stopper 33 and a groove to engage the fastening protrusion 332 is formed in the inner surface of the horizontal section 21 of the valve housing, so that the fastening protrusion 332 and the groove are fastened to secure the position of the stopper 33. The stopper may be inserted in the horizontal section 21 of the valve housing and connected together by using threaded equipment or any other different methods.

Figure 2B:
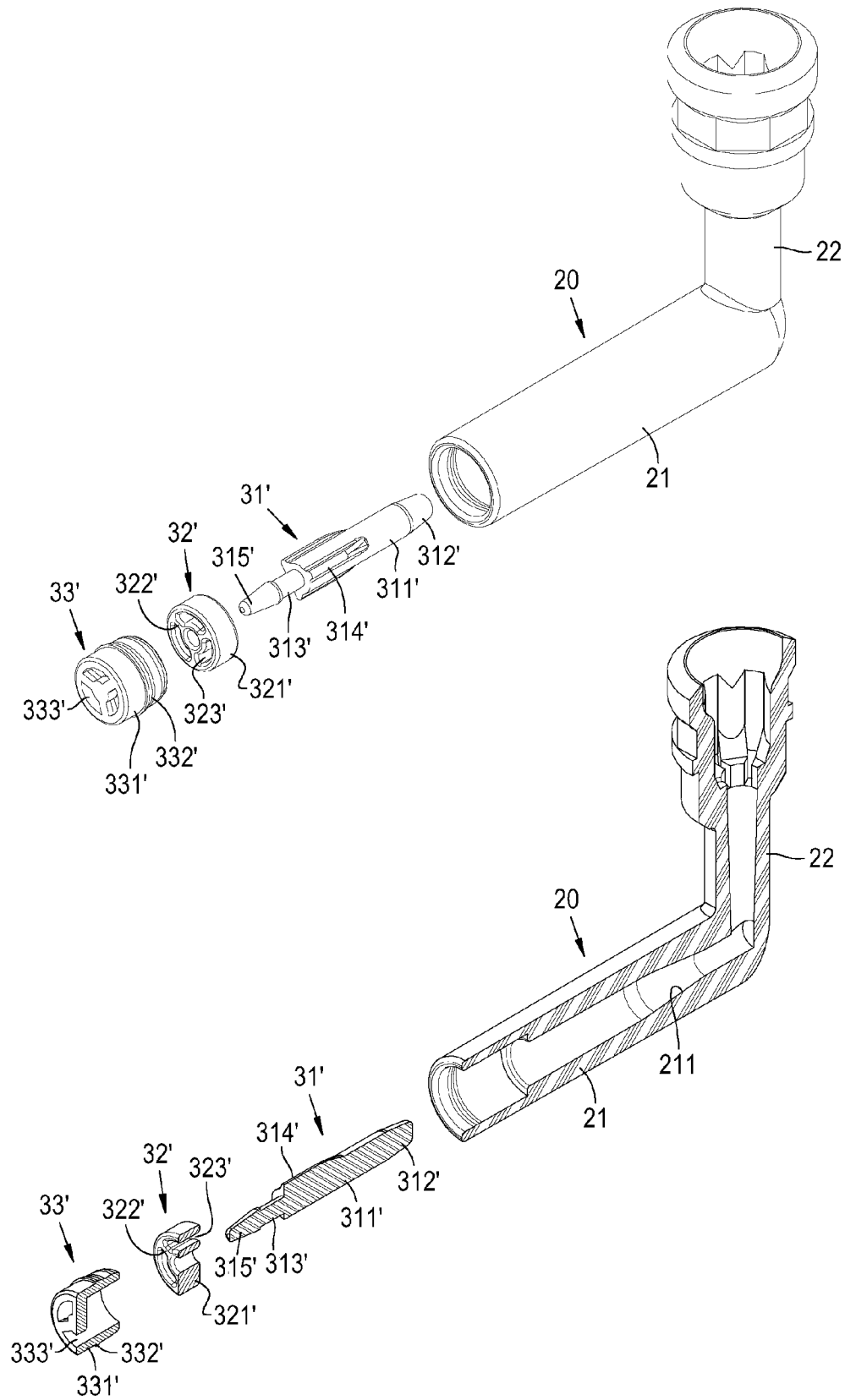
FIG. 2b is an exploded view of a safety valve according to a second embodiment of the present invention.

FIG. 2b shows a safety valve according to the second embodiment of the present invention. The safety valve according to the second embodiment comprises a pin 31', a bridge holder 32' and a stopper 33' to be assembled together. The pin 31' comprises: a body section 311' in a cylindrical shape, a flow channel blocking section 312', a holding section 313', a flow channel forming projection 314' and a guide section 315', which are integrally formed. The flow channel blocking section 312' with an inclined outer surface like a truncated conical shape is positioned in the front of the body section 311'. The holding section 313' in a cylindrical shape with a diameter smaller than the diameter of the body section 311' in the cylindrical shape is positioned at the rear of the body section 311' and has a raised part around the rear end of the holding section 313'. The flow channel forming projection 314' protrudes, at equal intervals and lengthwise, from the outer surface of the rear of the body section 311', to form a gas flow channel between the flow channel forming projections. The guide section 315' extends, in a predetermined length, from the rear end of the holding section 313'. The rear end of the guide section 315' extending from the rear of the holding section 313' is assembled to contact to the center of the stopper 33'. Thus, since the pin 31' is assembled without being twisted upon assembling the safety valve, the safety valve is stably assembled and an assembly defect is reduced.

The bridge holder 32' comprises: a connection body 321', a bridge 322' and a gas flow opening 323'. The connection body 321' is in a ring shape with a certain width. The bridge 322' has a concentric center with the connection body 321' in the ring shape, a through-hole formed in the concentric center to allow the cylinder-shaped holding section 313 ' of the pin 31' to pass through, and rod-shaped members formed at regular intervals to connect the ring shape and the outer surface of the concentric center, which are integrally formed. The gas flow opening 323' is formed in the space between the rod-shaped members of the bridge 322'. Upon assembling, the cylinder-shaped holding section 313' of the pin 31' passes through the through-hole formed in the concentric circle which is formed in the center of the bridge holder 32', and the raised part around the rear end of the holding section 313' is placed at the through-hole of the concentric circle of the bridge holder 32'.

The stopper 33' is connected to the rear end of the horizontal section 21 of the valve housing, and the fastening method is the same as in the first embodiment. In the stopper 33', a gas passage 333' to permit the gas filled in the gas container to flow through the flow channel formed in the valve housing is formed to pass through a combined body 331'. A plurality of gas passages 333' may be dividedly installed around the center of the combined body 331'.

The bridge holder 32' is made of a material having a melting point which is lower than that of both the pin 31' and the stopper 33'. When the inside of the gas container overheats above a predetermined temperature, the bridge 322' in the bridge holder 32' melts and can no longer support the pin 31' supportedly assembled by the raised part of the holding section 313' in the through-hole in the concentric circle formed in the center of the bridge 322'. Therefore, the pin 31' becomes free to move so that the outer surface of the flow channel blocking section 312' of the pin 31' sealingly engages the inner surface of the gas blocking section 211 formed in the horizontal section 21 of the valve housing, to close the flow channel to block the gas discharge.

Figure 3A:
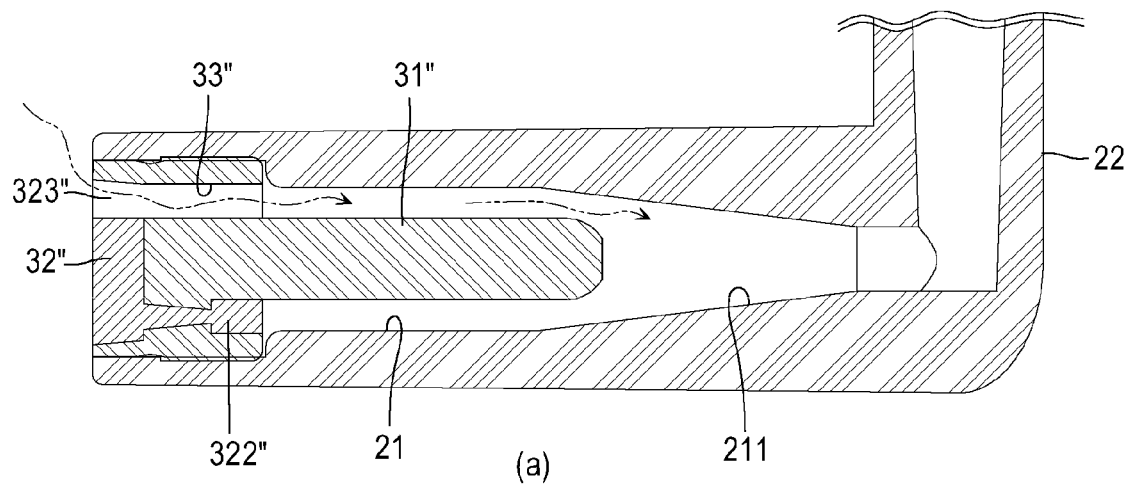
FIG. 3a is a cross-sectional view of the states before and after operating a safety valve according to a third embodiment of the present invention and FIG. 3b is an exploded view of the safety valve.
Figure 3A:
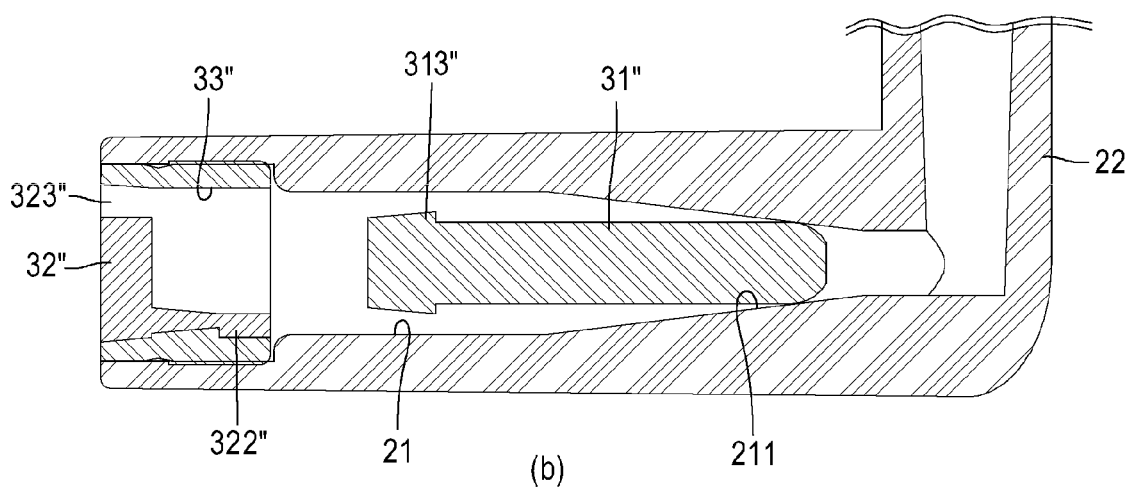
Figure 3B:
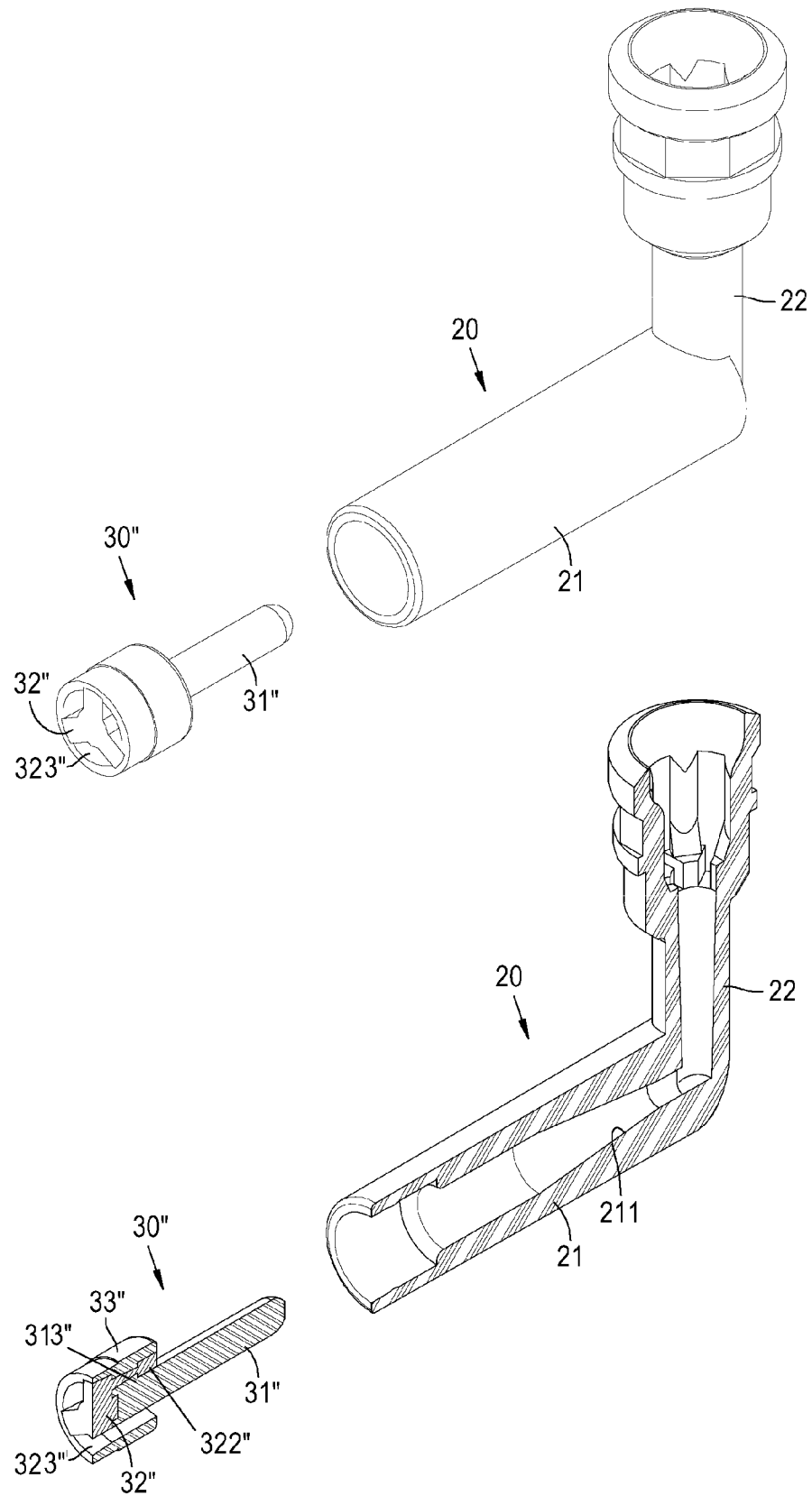

FIGS. 3a and 3b show a safety valve according to the third embodiment of the present invention. The safety valve according to the third embodiment comprises a pin 31", a bridge holder 32" and a stopper 33", which are integrally formed. The bridge holder 32" is made of a material having a melting point which is lower than that of both the pin 31" and the stopper 33". The pin 31" and the bridge holder 32" and the stopper 33" are integrally manufactured by double injection. Therefore, since the safety valve integrally made in a single piece is just pushed in at the rear end of the horizontal section 21 of the valve housing, assembling the valve is very easy.

The pin 31" comprises: a body section 311" in a cylindrical shape, a flow channel blocking section 312", and a holding section 313", which are integrally formed. The flow channel blocking section 312" with an inclined outer surface like a truncated conical shape is positioned at the front end of the body section 311". The holding section 313" is positioned at the rear end of the body section 311" and is formed in a radial shape to protrude than the outer surface of the body section 311" in the cylindrical shape. The holding section 313" is tapered backwardly such that its diameter is smaller towards its rear end. The space between the radially protruding parts in the holding section 313" functions as a gas flow channel.

The stopper 33" is formed in a ring shape with a through-hole in its center. The stopper 33" is connected to the rear end of the horizontal section 21 of the valve housing by the same connection method as in the first embodiment. The bridge holder 32" is connected by being inserted into the through-hole formed in the center of the stopper 33". The bridge holder 32" includes a bridge 322" and a gas flow opening 323". The bridge 322" to hold the holding section 313" of the pin 31" is formed at the front end of the bridge holder 32", and the gas flow opening 323" through which gas enters is formed at the rear end of the bridge holder 32". The holding section 313" of the pin 31" is manufactured in the state of being supported by the bridge 322" of the bridge holder 32". Therefore, the pin 31", the bridge holder 32" and the stopper 33" are integrally manufactured such that the body section 311" of the pin 31" passing through the center of the bridge holder 32" (means the space formed between the bridge 322") protrudes forwardly than the bridge holder 32" and the stopper 33" (see FIG. 3a).

When the inside of the gas container overheats above a predetermined temperature, the bridge 322" of the bridge holder 32" melts. At this time, since the pressure released from the inside of the gas container increases, the holding section 313" of the pin 31", which is integrally formed and supported by the bridge 322" of the bridge holder 32", separates from the bridge holder 32" and becomes free to move so that the outer surface of the flow channel blocking section 312" of the pin 31" sealingly engage the inner surface of a gas blocking section 211 formed in the horizontal section 21 of the valve housing, to close the flow channel to block the gas discharge (see FIG. 3b).

Figure 4A:
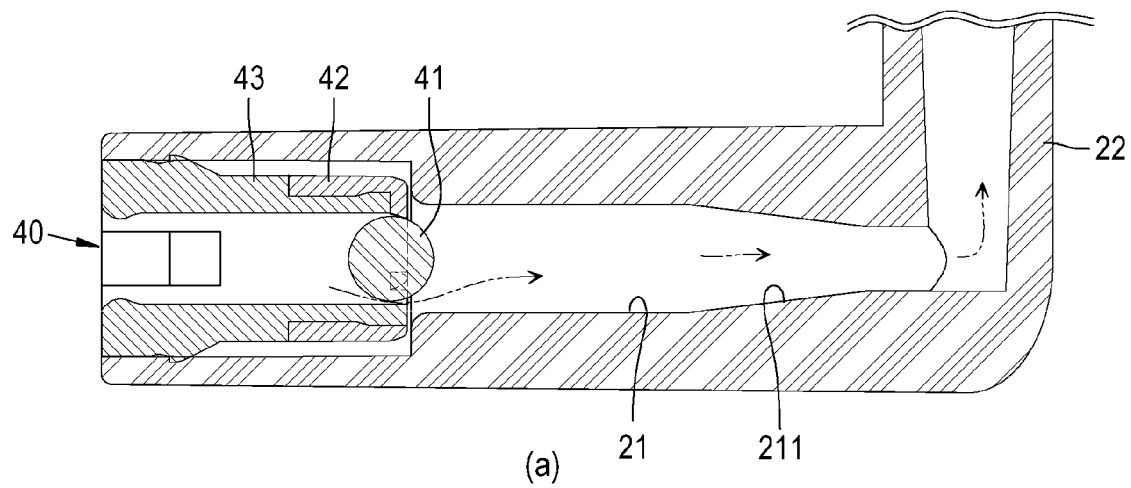
FIG. 4a is a cross-sectional view of the states before and after operating a safety valve according to a fourth embodiment of the present invention and FIG. 4b is an exploded view of the safety valve.
Figure 4A:
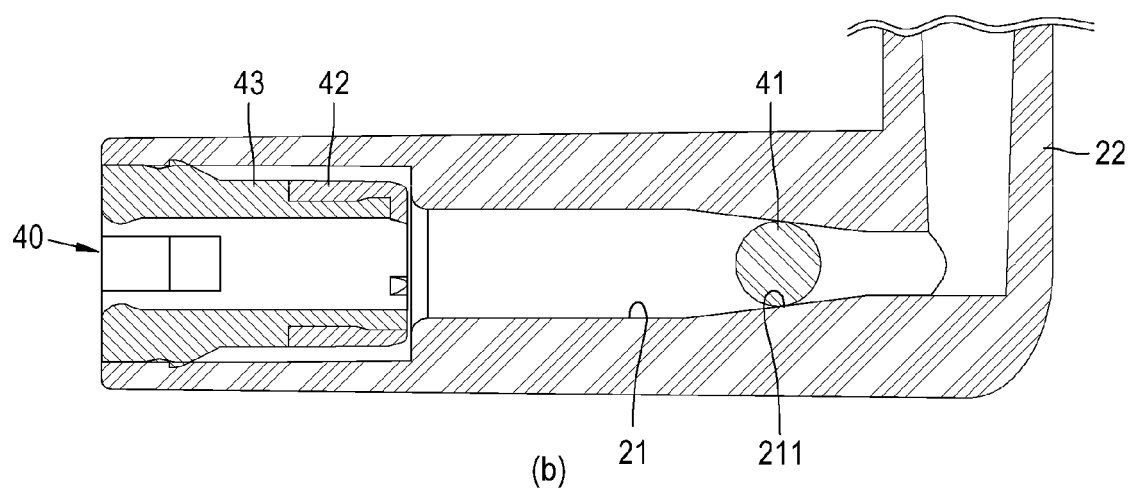
Figure 4B:
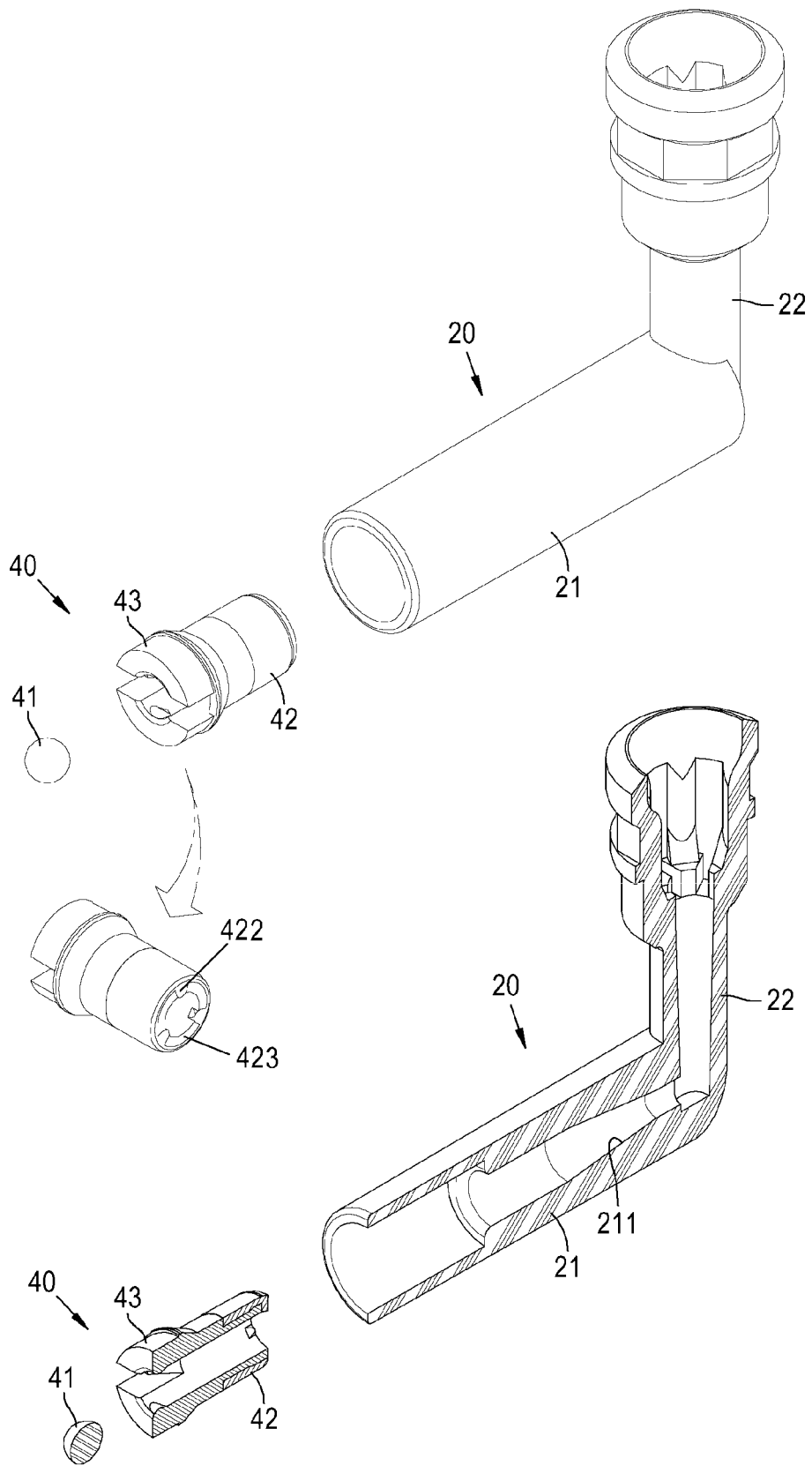

FIGS. 4a and 4b show a safety valve according to the fourth embodiment of the present invention. The safety valve according to the fourth embodiment comprises a ball 41 in a spherical shape to block a flow channel, a bridge holder 42 and a stopper 43, both which are integrally formed. The ball 41 in the spherical shape is assembled to be positioned in the bridge holder 42 and the stopper 43. In the state that the bridge holder 42 and the stopper 43 are integrally manufactured, only the ball 41 is just pushed into for assembly. Therefore, assembling of the valve is easy.

The method of connecting the stopper 43 to the rear end of the horizontal section 21 of the valve housing is the same as in the first embodiment. The stopper 43 with a through-hole formed in its center has its front and rear parts being open. In the case that the rear part is divided by two, since it has elasticity upon assembling, the assembling work is easy. The outer surface of the front part of the stopper 43 is smaller in diameter than the outer surface of the rear part thereof.

The outer surface of the front part of the stopper 43 is inserted into the bridge holder 42 so that the bridge holder 42 and the stopper 43 are integrally formed. A bridge 422 is positioned at the front end of the bridge holder 42. The bridge 422 to support the ball 41 is formed by a plurality of projections protruding, at equal intervals, towards the center. A gas flow opening 423 is formed between the projections forming the bridge 422. The bridge holder 42 is made of a material having a melting point which is lower than that of both the ball 42 and the stopper 43. The bridge holder 42 and the stopper 43 are integrally manufactured by double injection. The ball 41 is assembled to be held by the projections forming the bridge 422 of the bridge holder 42 [see FIG. 4a(a)].

When the inside of the gas container overheats above a predetermined temperature, the bridge 422 of the bridge holder 42 melts. At this time, since the pressure released from the inside of the gas container increases, a plurality of the projections of the bridge 422 cannot function as a support and therefore, the ball 41 assembled in the state of being supported by the bridge 422 separates from the bridge holder 42 and becomes free to move so that the ball 41 is tightly inserted into the gas blocking section 211 formed in the horizontal section 21 of the valve housing, to close the flow channel to block the gas discharge [see FIG. 4a(b)].

Figure 5A:
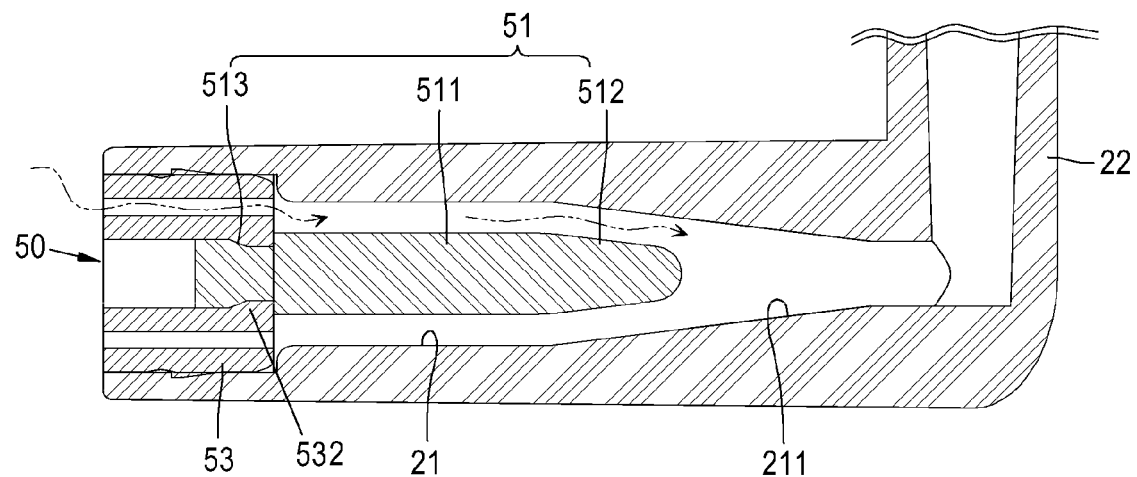
FIG. 5a is a cross-sectional view of the states before and after operating a safety valve according to a fifth embodiment of the present invention and FIG. 5b is an exploded view of the safety valve.
Figure 5A:
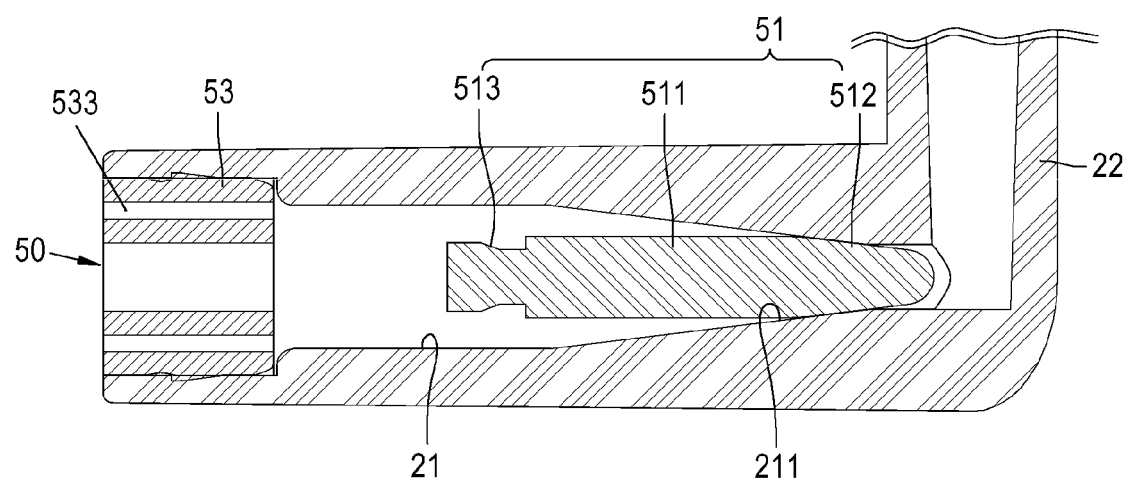
Figure 5B:
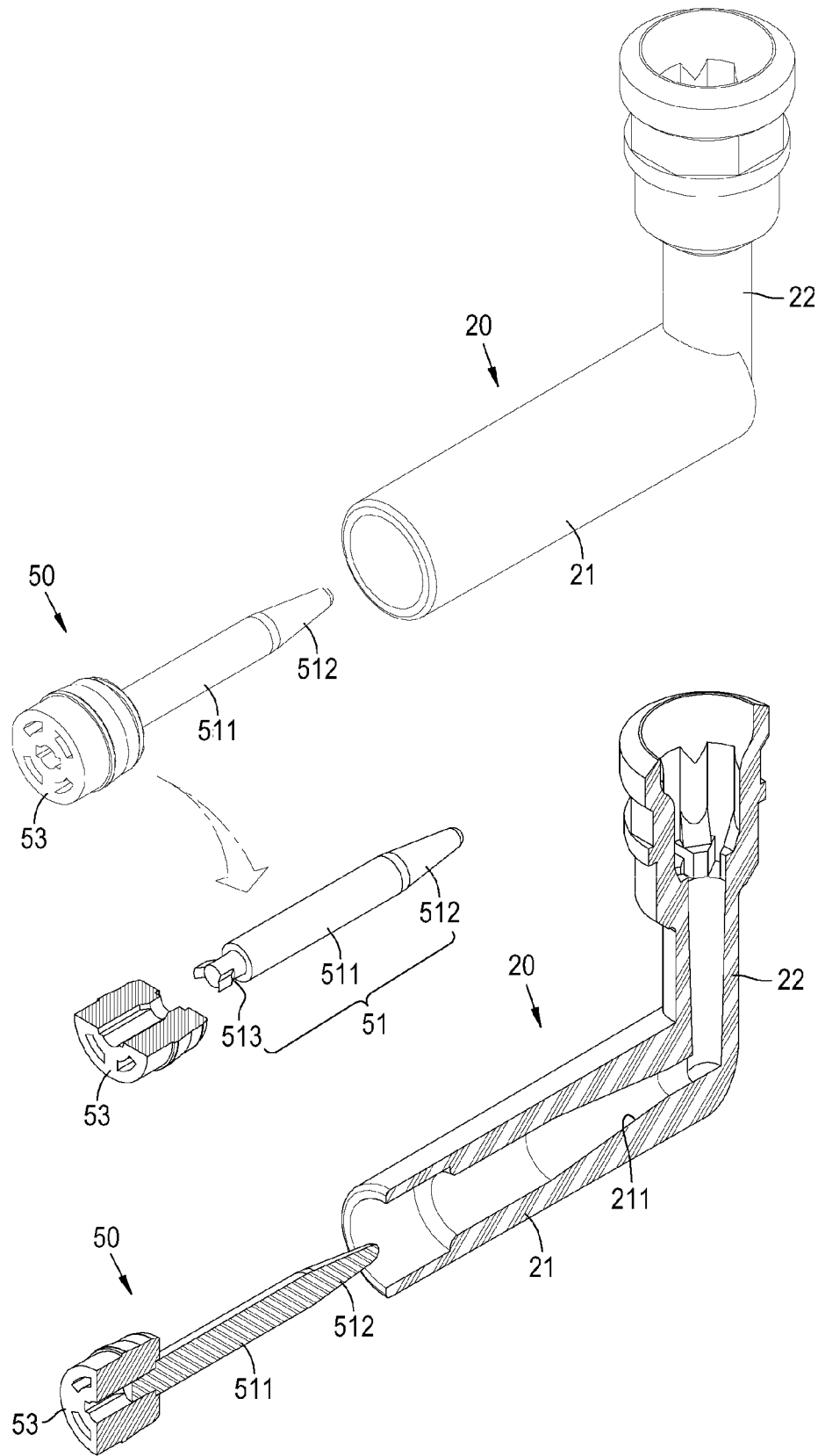

FIGS. 5a and 5b show a safety valve 50 according to the fifth embodiment of the present invention. The safety valve 50 according to the fifth embodiment comprises a pin 51 to block a flow channel when the gas container overheats, and a stopper 53 made of a material having a melting point which is lower than that of the pin 51, wherein the pin 51 and the stopper 53 are integrally formed. Since the safety valve 50 is formed of two pieces, the structure is simple and assembling the valve is also easy.

The pin 51 comprises: a body section 511 in a cylindrical shape, a flow channel blocking section 512, and a holding section 513, which are integrally formed. The flow channel blocking section 512 with an inclined outer surface like a truncated conical shape is positioned at the front end of the body section 511. The holding section 513 is positioned at the rear end of the body section 511 in the cylindrical shape. The holding section 513 is in a cylindrical shape with a smaller diameter than the diameter of the body section 511 in the cylindrical shape and has a raise part formed at its rear end.

The stopper 53 is connected to the rear end of the horizontal section 21 of the valve housing, and the connection method is the same as in the first embodiment. The stopper 53 includes a gas flow opening 533 and a bridge 532. A plurality of the gas flow openings 533 are formed to pass through from the rear end of the stopper 53 to the front end thereof, to permit flow of the gas filled in the gas container to the gas channel formed in the valve housing. A through-hole is formed to pass through the center of the gas flow opening 533. The diameter of the through-hole becomes smaller towards its front end, so that a bridge 532 is formed to support the holding section 513 of the pin 51. The stopper 53 is made of a material having a melting point which is lower than that of the pin 51. The pin 51 is inserted into the through-hole to pass through the center of the stopper 53 so that the body section 511 of the pin 51 protrudes forwardly in front of the stopper 53.

When the inside of the gas container overheats above a predetermined temperature, the bridge 532 of the stopper 53 melts. At this time, since the pressure released from the inside of the gas container increases, the bridge 532 of the stopper 53 is not able to support the pin 51. Therefore, the holding section 513 of the pin 51 supported by the bridge 532 separates from the stopper 53 and becomes free to move so that the outer surface of the flow channel blocking section 512 of the pin 51 sealingly engages the inner surface of the gas blocking section 211 formed in the horizontal section 21 of the valve housing, to close the flow channel to block the gas discharge.

Figure 6A:
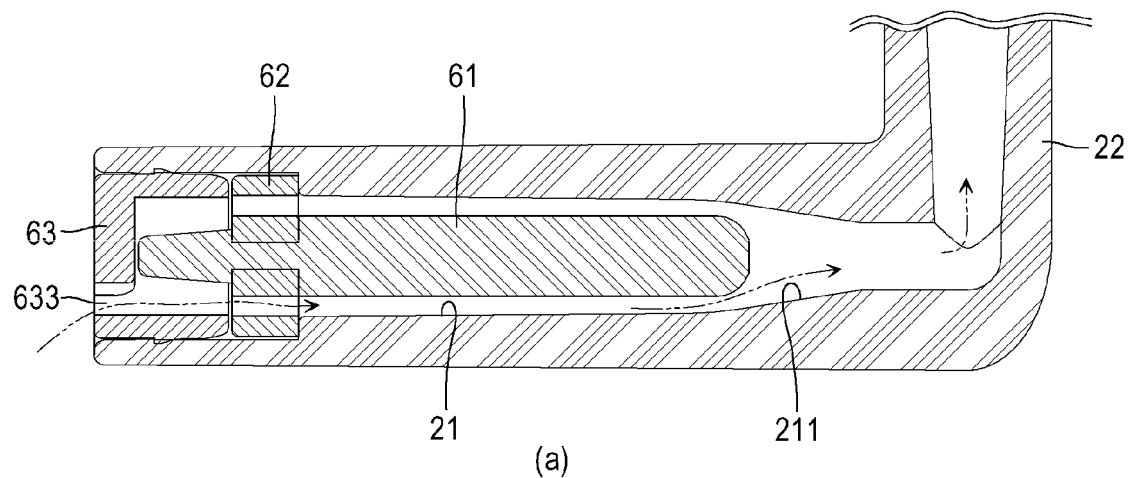
FIG. 6a is a cross-sectional view of the states before and after operating a safety valve according to a sixth embodiment of the present invention and FIG. 6b is an exploded view of the safety valve.
Figure 6A:
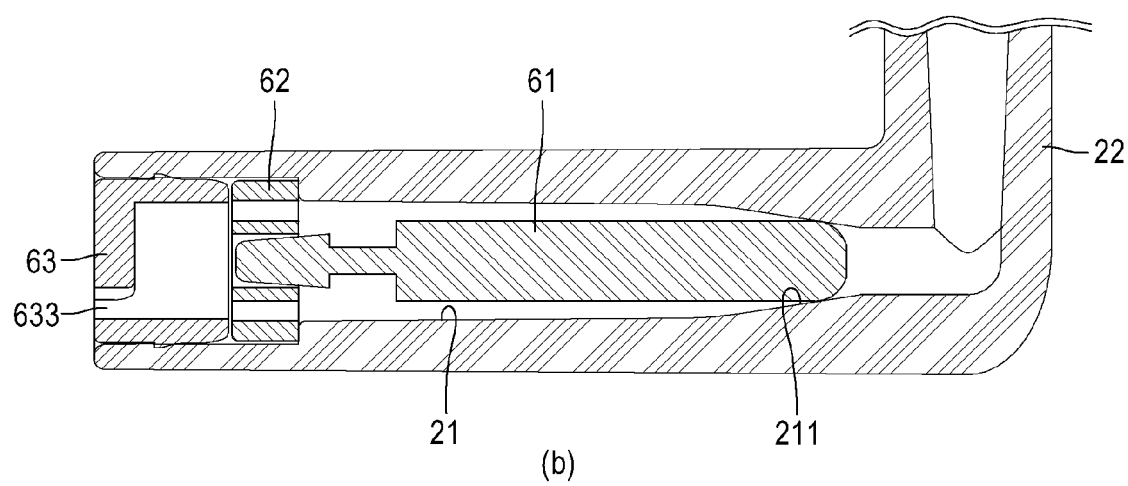
Figure 6B:
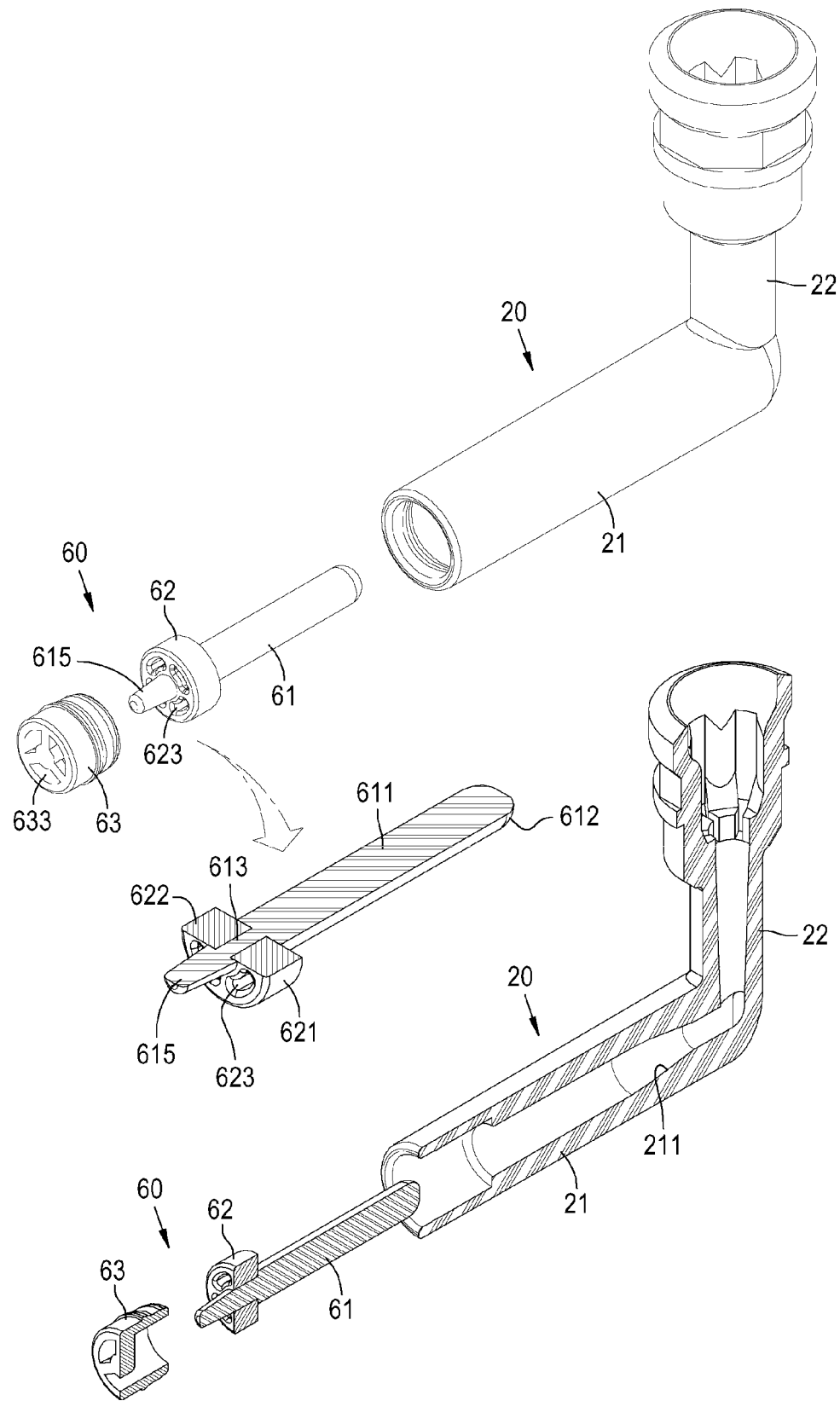

FIGS. 6a and 6b show a safety valve 60 according to the sixth embodiment of the present invention. In the safety valve 60 according to the sixth embodiment, a pin 61 and a bridge holder 62 are integrally formed by double injection, by modifying the safety valve according to the second embodiment. The safety valve 60 comprises the pin 61 to block a flow channel when the gas container overheats, the bridge holder 62 made of a material having a melting point which is lower than the pin 61, the pin 61 and the bridge holder 62 integrally formed, and a stopper 63 connected to the rear end of the horizontal section of the valve housing. Since the pin 61 and the bridge holder 62 are integrally formed by double injection, the structure of the safety valve 60 is simple and assembling is also easy.

The pin 61 comprises: a body section 611 in a cylindrical shape, a flow channel blocking section 612, a holding section 613 and a guide section 615, which are integrally formed. The flow channel blocking section 612 with an inclined outer surface is formed at the front end of the body section 611. The holding section 613 positioned at the rear end of the body section 611 is in a cylindrical shape with a smaller diameter than the diameter of the body section 612 in the cylindrical shape and has a raised part protruding from its rear end. The guide section 615 extends, at a predetermined length, from the rear end of the holding section 613. Since the safety valve 60 does not include only the flow channel forming projection 314' among the constituent elements of the safety valve according to the second embodiment, the overlapping description is not presented.

The bridge holder 62 comprises: a connection body 621, a bridge 622 and a gas flow opening 623 formed between rod-shapes. Since the bridge holder 62 has the same structure as that of the bridge holder 32' in the second embodiment, no overlapping description is presented.

The stopper 63 is connected to the rear end of the horizontal section 21 of the valve housing. A gas passage to permit the gas filled in the gas container to flow through a flow channel formed in the valve housing is formed to pass through the stopper 63. The structure of the stopper 63 is the same as the stopper 33' in the second embodiment.

The bridge holder 62 is made of a material having a melting point which is lower than that of both the pin 61 and the stopper 63. In the state that the cylinder-shaped holding section 613 of the pin 61 passes through a through-hole of the concentric circle formed in the center of the bridge holder 62 and the raised part protruding at the rear end of the holding section 613 of the pin 61 is supported by the through-hole formed at the center of the bridge holder 62, the pin 61 and the bridge holder 62 are integrally formed by double injection.

When the inside of the gas container overheats above a predetermined temperature, the bridge 622 of the bridge holder 62 melts and is not able to support the pin 61. At this time, since the pressure released from the inside of the gas container increases, the pin 61, which is supported by and integrally formed with the bridge 622 of the bridge holder 62, separates and becomes free to move so that the outer surface of the flow channel blocking section 612 of the pin 61 sealingly engages the inner surface of the gas blocking section 211 formed in the horizontal section 21 of the valve housing, to close the flow channel to block the gas discharge.

In the flow-blocking safety valve for a portable gas container according to the present invention, when the gas container overheats during use and the temperature thereof rises above a predetermined level, the bridge holder melts and cannot support the pin or ball which has been connected in the valve housing by forming the safety valve and has been securely supported by the bridge holder. The pin or ball securely supported by the bridge holder becomes free to move to block the channel through which gas flows, to close the channel to block the gas discharge, thereby preventing an accident that occurs when the gas container bursts by overheating.

Further, in the safety valve comprising the bridge holder and the pin and the stopper, since the stopper is assembled at the entrance of the valve housing while the pin or ball held by the bridge holder is assembled in the valve housing, the structure is very simple and the assembling of the valve is convenient and easy. Therefore, the manpower and time required for assembling are significantly reduced, the manufacturing section price considerably lowers, and the malfunction of the safety valve does not occur when the gas container overheats.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A flow-blocking safety valve to prevent an explosion of a portable gas container which has a valve housing in an 'L'-shape with a horizontal section and a vertical section forming a gas channel to discharge gas, and a safety valve insertedly connected to the rear end of the gas channel in the horizontal section to close the gas channel to block the gas discharge, the flow-blocking safety valve comprising:
   a pin including a body section, a flow channel blocking section, a holding section and a gas flow channel, which are integrally formed, wherein the body section is in a cylindrical shape, the flow channel blocking section positioned at the front end of the body section has a forwardly tapered outer surface, the holding section positioned at the rear end of the body section is in a disk shape with a diameter greater than the diameter of the body section in the cylindrical shape, and the gas flow channel positioned at the rear end of the holding section has flat members radially arranged to form a passage through which the gas flows between the flat members;
   a bridge holder including a connection body in a ring shape having a predetermined width, a bridge with raised parts protruding, at equal intervals, from the ring-shaped inner surface to the center, and a gas flow opening formed between the raised parts of the bridge; and
   a stopper connected to the rear end of the horizontal section of the valve housing and including, in a center of the stopper, a gas passage through which the gas filled in the gas container flows to the gas channel formed in the valve housing,
   wherein the body section of the pin passes through the center of the bridge holder, the holding section of the pin is supported in the bridge of the bridge holder so that the pin and the bridge holder are assembled together, and when the inside of the gas container overheats above a predetermined temperature, the bridge of the bridge holder melts and thus the pin supportedly assembled in the bridge becomes free to move so that the flow channel blocking section of the pin sealingly engages a gas blocking section formed in the horizontal section of the valve housing, to close the flow channel to block the gas discharge.

2. A flow-blocking safety valve to prevent an explosion of a portable gas container which has a valve housing in an 'L'-shape with a horizontal section and a vertical section forming a gas channel to discharge gas, and a safety valve insertedly connected to the rear end of the gas channel in the horizontal section to close the gas channel to block the gas discharge, the flow-blocking safety valve comprising:
   a pin including a body section, a flow channel blocking section, a flow channel forming projection, a holding section and a guide section, which are integrally formed, wherein the body section is in a cylindrical shape, the flow channel blocking section positioned at the front end of the body section has a forwardly tapered outer surface, the flow channel forming projection protruding, at equal intervals, at the outer surface of the rear end of the body section, to form a gas flow channel between the flow channel forming projections, the holding section positioned at the rear end of the body section is in a cylindrical shape with a diameter smaller than the diameter of the body section in the cylindrical shape and includes a raised part around its rear end, and the guide section extending from the rear end of the holding section at a predetermined length;
   a bridge holder including a connection body, a bridge and a gas flow opening, wherein the connection body is in a ring shape having a predetermined width, the bridge has a concentric center with the connection body in the ring shape, a through-hole formed in the concentric center to allow the cylinder-shaped holding section of the pin to pass through, and a rod-shaped member connecting the ring shape and the outer surface of the concentric center, which are integrally formed, and the gas flow opening formed between the rod-shaped members of the bridge; and
   a stopper connected to the rear end of the horizontal section of the valve housing and including a gas passage through which the gas filled in the gas container flows to the gas channel formed in the valve housing,
   wherein the cylinder-shaped holding section of the pin passes through the through-hole of the concentric center of the bridge holder, the raised part around the rear end of the holding section of the pin is supported and assembled in the through-hole formed in the center of the bridge holder, and when the inside of the gas container overheats above a predetermined temperature, the bridge of the bridge holder melts and thus the pin supportedly assembled in the bridge becomes free to move so that the flow channel blocking section of the pin sealingly engages a gas blocking section formed in the horizontal section of the valve housing, to close the flow channel to block the gas discharge.

3. The flow-blocking safety valve according to claim 2, wherein the bridge holder is made of a material having a melting point which is lower than that of both the pin and the stopper.

4. A flow-blocking safety valve to prevent an explosion of a portable gas container which has a valve housing in an 'L'-shape with a horizontal section and a vertical section forming a gas channel to discharge gas, and a safety valve insertedly connected to the rear end of the gas channel in the horizontal section to close the gas channel to block the gas discharge, the flow-blocking safety valve comprising:
   a pin including a body section in a cylindrical shape, a flow channel blocking section and a holding section, all which are integrally formed, the flow channel blocking section positioned at the front end of the body section has a forwardly tapered outer surface, and the holding section positioned at the rear end of the body section and formed in a radial shape such that the holding section protrudes higher than the outer surface of the body section in the cylindrical shape but tapers backwardly to be smaller in the diameter of the rear end of the holding section;

a stopper connected to the rear end of the horizontal section of the valve housing and including a through-hole in a center of the stopper;

a bridge holder connected by being inserted into the through-hole formed in the center of the stopper and includes a gas flow opening to allow a gas to enter, at its rear end, and a bridge to support the holding section of the pin, at its front, wherein the bridge holder is made of a material having a melting point which is lower than that of both the pin and the stopper, and the pin, the bridge holder and the stopper are integrally formed by double injection in the state that the holding section of the pin is supported in the bridge of the bridge holder, so that the body section of the pin passes through the center of the bridge holder to forwardly protrude than the bridge holder and the stopper, and when the inside of the gas container overheats above a predetermined temperature, the bridge of the bridge holder melts and thus the pin supportedly assembled in the bridge becomes free to move so that the flow channel blocking section of the pin sealingly engages a gas blocking section formed in the horizontal section of the valve housing, to close the flow channel to block the gas discharge.

5. A flow-blocking safety valve to prevent an explosion of a portable gas container which has a valve housing in an 'L'-shape with a horizontal section and a vertical section forming a gas channel to discharge gas, and a safety valve insertedly connected to the rear end of the gas channel in the horizontal section to close the gas channel to block the gas discharge, the flow-blocking safety valve comprising:

a bridge holder and a stopper which are integrally formed; and a ball in a spherical shape which is assembled to be positioned in the bridge holder and the stopper, wherein the stopper is connected to the rear end of the horizontal section of the housing and includes a through-hole at a center of the stopper so that the front and rear of the stopper are open, the outer surface of the front of the stopper is smaller in diameter than the outer surface of the rear of the stopper, the bridge holder is formed by inserting the outer surface of the front of the stopper, the bridge holder includes, at its front end, a bridge formed by projections protruding, at equal intervals, towards the center, to support the ball, and a gas flow opening formed between the bridges, wherein the bridge holder is made of a material having a melting point which is lower than that of both the ball and the stopper, the bridge holder and the stopper are integrally formed by double injection, the ball is assembled in the state of being supported in the bridge of the bridge holder, and when the inside of the gas container overheats above a predetermined temperature, the bridge of the bridge holder melts and thus the ball supportedly assembled in the bridge separates from the bridge holder and becomes free to move so that the ball sealingly engages a gas blocking section formed in the horizontal section of the valve housing, to close the flow channel to block the gas discharge.

6. A flow-blocking safety valve to prevent an explosion of a portable gas container which has a valve housing in an 'L'-shape with a horizontal section and a vertical section forming a gas channel to discharge gas, and a safety valve insertedly connected to the rear end of the gas channel in the horizontal section to close the gas channel to block the gas discharge, the flow-blocking safety valve comprising:

a pin including a body section, a flow channel blocking section and a holding section, which are integrally formed, wherein the body section is in a cylindrical shape, the flow channel blocking section positioned at the front end of the body section has a forwardly tapered outer surface, and the holding section positioned at the rear end of the body section is in a cylindrical shape with a diameter smaller than the diameter of the body section in the cylindrical shape and includes a raised part formed at the rear end of the holding section; and a stopper connected to the rear end of the horizontal section of the valve housing and including a gas flow opening and a through-hole, wherein the gas flow opening is formed to permit gas flow from the front end of the stopper to the rear end thereof, to permit the gas filled in the gas container to flow through the gas channel formed in the valve housing, and the through-hole passes through the center of the gas flow opening and tapers forwardly so that its diameter becomes smaller at its front end, to form a bridge to support the holding section of the pin, wherein the stopper is made of a material having a melting point which is lower than that of the pin, the body section of the pin is integrally formed to protrude in the front of the stopper in the state that the pin is inserted into the through-hole passing through the center of the stopper, and when the inside of the gas container overheats above a predetermined temperature, the bridge of the stopper melts and thus the holding section of the pin supportedly formed in the bridge of the stopper becomes free to move so that the flow channel blocking section of the pin sealingly engages a gas blocking section formed in the horizontal section of the valve housing, to close the flow channel to block the gas discharge.

7. A flow-blocking safety valve to prevent an explosion of a portable gas container which has a valve housing in an 'L'-shape with a horizontal section and a vertical section forming a gas channel to discharge gas, and a safety valve insertedly connected to the rear end of the gas channel in the horizontal section to close the gas channel to block the gas discharge, the flow-blocking safety valve comprising:

a pin including a body section, a flow channel blocking section, a holding section and a guide section, which are integrally formed, wherein the body section is in a cylindrical shape, the flow channel blocking section positioned at the front end of the body section has a forwardly tapered outer surface, the holding section positioned at the rear end of the body section is in a cylindrical shape with a diameter smaller than the diameter of the body section in the cylindrical shape and includes a raised part formed at the rear end of the holding section, and the guide section extends from the rear end of the holding section, at a predetermined length;

a bridge holder including a connection body, a bridge and a gas flow opening, wherein the connection body is in a ring shape having a predetermined width, the bridge has a concentric center with the ring shape of the connection body, a through-hole formed in the concentric center to allow the cylinder-shaped holding section of the pin to pass through, and an integrally formed rod-shaped member connecting the ring shape and the outer surface of the concentric center, and the gas flow opening formed between the rod-shaped members of the bridge; and a stopper connected to the rear end of the horizontal section of the valve housing and including a gas passage to permit the gas filled in the gas container to flow through the gas channel formed in the valve housing, wherein the bridge holder is made of a material having a melting point which is lower than that of both the pin and the stopper, the pin and the bridge holder are integrally formed by double injection in the state that the cylinder shape of the holding section of the pin passes through the through-hole of the concentric center of the bridge holder and the raised part of the rear end of the holding section of the pin is supported in the through-hole formed the center of the bridge holder, and when the inside of the gas container overheats above a predetermined temperature, the bridge of the bridge holder melts and thus the pin supportedly and integrally formed in the bridge separates and becomes free to move so that the flow channel blocking section of the pin sealingly engages a gas blocking section formed in the horizontal section of the valve housing, to close the flow channel to block the gas discharge.

8. The flow-blocking safety valve according to claim 1, wherein the bridge holder is made of a material having a melting point which is lower than that of both the pin and the stopper.

* * * * *